US000001840H

United States Statutory Invention Registration [19]

[11] Reg. Number: H1,840

Carew et al. [45] Published: Feb. 1, 2000

[54] APPARATUS AND METHOD OF PROVIDING CALIBRATION INFORMATION TO AN OPERATOR OF A WORK MACHINE

[75] Inventors: Kevin J. Carew, Peoria, Ill.; Randal K. Krieg, Wasilla, Ak.

[73] Assignee: Caterpillar Inc., Peoria, Ill.

[21] Appl. No.: 09/159,019

[22] Filed: Sep. 23, 1998

[51] Int. Cl.[7] ..... G05B 23/02

[52] U.S. Cl. ..... 702/85

*Primary Examiner*—Daniel T. Pihulic
*Attorney, Agent, or Firm*—Byron G. Buck, II

[57] ABSTRACT

An apparatus and method of providing at least one calibration prompt message to an operator of a work machine is disclosed. Whether the work machine control system is in calibration mode is determined. At least one calibration prompt message containing a detailed description of the calibration step to be performed is read from a memory. At least one calibration prompt message is provided to the operator. Preferably, at least one abbreviated calibration routine message is provided to the operator in a text message on a first display and the calibration prompt message is provided to the operator in a scrolling text message across a second display of the user interface.

10 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

APPARATUS AND METHOD OF PROVIDING CALIBRATION INFORMATION TO AN OPERATOR OF A WORK MACHINE

TECHNICAL FIELD

This invention relates generally to an apparatus and method of providing calibration information to an operator of a work machine and, more particularly, to an apparatus and method that provides at least one calibration prompt message containing a detailed description of the calibration step to be performed to the operator.

BACKGROUND ART

Work machines having an attached implement, such as motor graders, excavators, mining shovels, backhoes, wheel loaders, track type tractors, and the like, are used for moving earth. Such implements may include blades, impact rock rippers, and other material handling apparatus. Typically, work machines may be configured to perform various work cycles. For example, a motor grader typically has a blade used to cut a particular grade and/or slope across the ground. Because a motor grader has many joints, having a range of movement, many sensors, electronic circuits, solenoids, and mechanisms are used to provide control of the work machine. Sometimes, some of these portions of the work machine require calibration. Currently, on work machines, it is possible to damage the machine or incorrectly move or cut the earth if portions of the work machine are not calibrated properly. For example, on a motor grader, if a blade sensor is not calibrated properly, the motor grader will not cut the proper grade and/or slope across the ground. Similarly, if a frame sensor is not properly calibrated, a motor grader will not cut the proper slope and/or grade across the ground. This could cause damage to the motor grader, including the blade, or provide an incorrect finished grade and/or slope to the ground.

Additionally, calibration display systems currently on work machines typically provide abbreviations or codes representative of a calibration step or procedure to an operator. For example, a numerical code may be provided to an operator to indicate grounding a blade on a level surface using a blade float function. Generally, once the operator receives the abbreviation or numerical code, the operator must use a cross reference table or the user's manual to interpret and identify the particular calibration step represented by the abbreviation or numerical code.

It is undesirable to force the operator to memorize codes or retain a cross reference chart and keep it with the work machine. Similarly, it is undesirable to force the operator to refer to the user's manual in order to understand the abbreviation and numerical code, particularly when work machines are used on a large construction site, large mining site, or rented and the documentation for the machine is kept in a remote office. In this situation, it is difficult for operators, particularly new or less skilled operators, to interpret and understand the abbreviated or numerical codes.

Accordingly, the art has sought an apparatus and method of providing calibration information to an operator of a work machine which: provides at least one calibration prompt message containing a detailed description of the calibration step to be performed to the operator; eliminates the need for an operator to refer to a cross reference chart or other documentation to understand the calibration prompt message; reduces the required skill and knowledge required to operate the work machine; and is more economical to use.

The present invention is directed to overcoming one or more of the problems as set forth above.

DISCLOSURE OF THE INVENTION

In one aspect of the present invention, a work machine adapted to be controlled by an operator is provided. The work machine includes a frame, a plurality of grounding engaging devices, an operator compartment, an engine, and a work machine control system. The frame and the operator compartment are supported by the ground engaging devices. The engine is operably coupled to the ground engaging devices. The work machine control system has a calibration system which includes a memory, a controller, and an operator interface. The memory is adapted to store at least one calibration prompt message containing a detailed description of the calibration step to be performed. The controller is associated with the memory and is adapted to receive the at least one calibration prompt message, determine whether the work control system is in calibration mode, and responsively provide the at least one calibration prompt message. The operator interface is adapted to receive the at least one calibration prompt message and provide the calibration prompt message to the operator.

In another aspect of the present invention, a method of providing calibration information to an operator of the work machine is provided. A determination is made as to whether the work machine control system is in calibration mode. At least one calibration prompt message containing a detailed description of the calibration step to be performed is read from a memory. The at least one calibration prompt message is provided to the operator.

In another aspect of the present invention, a method of providing calibration information to an operator of a work machine is provided. A determination is made as to whether the work machine control system is in calibration mode. A determination is made as to whether quick calibration mode is selected. A determination is made as to whether the frame sensor or the blade sensor is selected for calibration. The at least one abbreviated calibration routine message and at least one calibration prompt message containing a detailed description of the calibration step to be performed is read from a memory in response to the steps of determining whether the work machine control system is in calibration mode, determining whether quick calibration mode is selected, and determining whether the frame sensor or the blade sensor is selected for calibration. The at least one abbreviated calibration routine message is provided to the operator in a text message on a first display and the calibration prompt message is provided to the operator in a scrolling text message across a second display of the user interface while the work machine control system is in calibration mode.

These and other aspects and advantages of the present invention will become apparent to those skilled in the art upon reading the detailed description of the best mode for carrying out the invention in connection with the drawings and appended claims.

BRIEF DESCRIPTION OF THE DRAWINGS

For a better understanding of the invention, reference may be made to the accompanying drawings, in which.

BEST MODE FOR CARRYING OUT THE INVENTION

Figure 1:
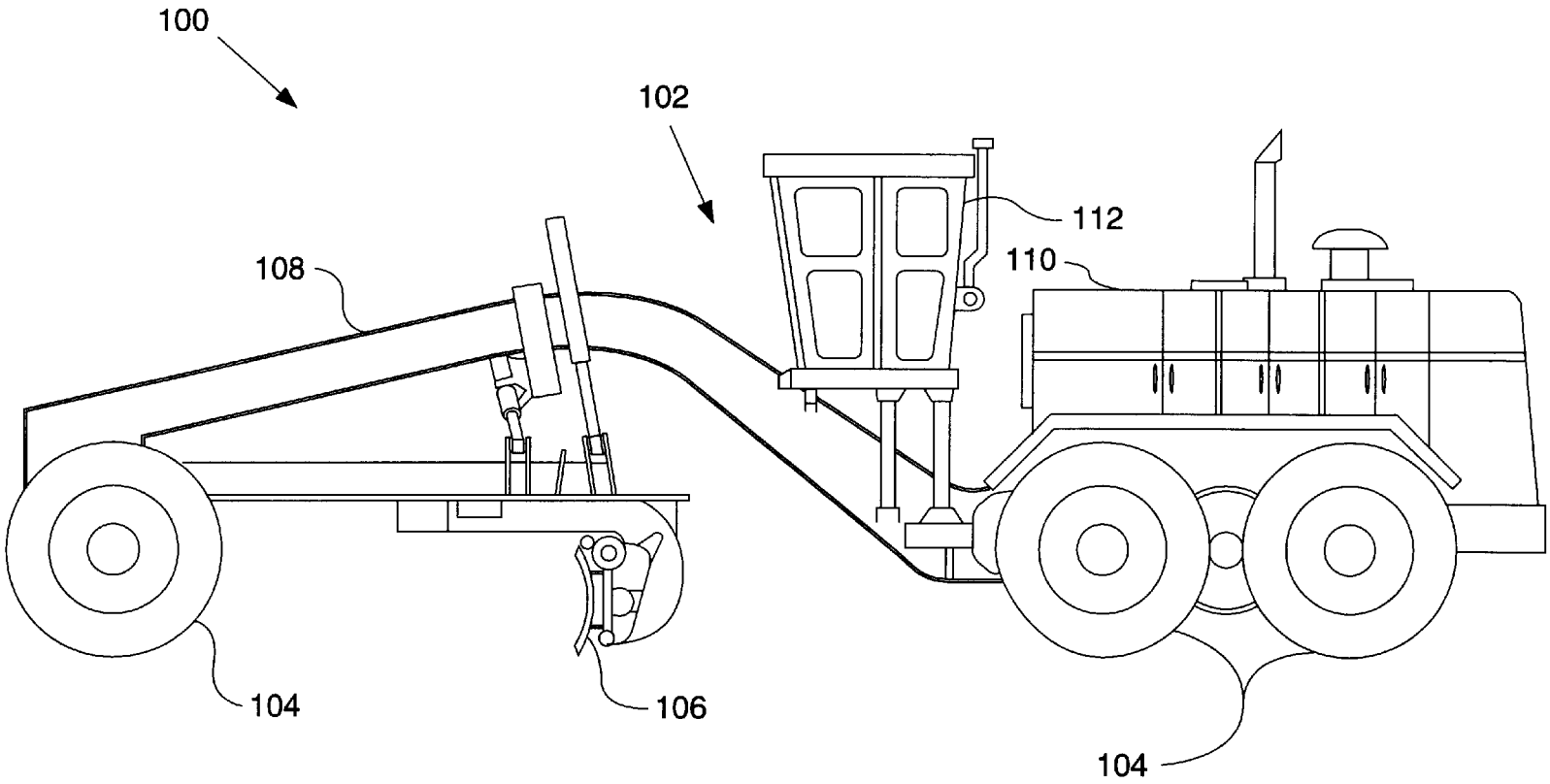
FIG. 1 is a side elevation view of a motor grader according to one embodiment of the present invention.

A preferred embodiment of the present invention provides an apparatus and method of providing at least one calibration prompt message to an operator of a work machine 100. The following description uses a motor grader 102 having wheels 104 and an implement, typically a blade 106, as an example only. This invention can be applied to other types of work machines 100 having tracks (not shown) instead of wheels 104 and another types of implements well known in the art. Other examples include mining shovels, wheel loaders, backhoes, track type tractors, hydraulic excavators, track type loaders, and the like.

In FIG. 1, a frame 108 is supported by a plurality of ground engaging devices 104. An engine 110 is operably coupled to the ground engaging devices 104. Additionally, an operator compartment 112 is supported by the ground engaging devices 104.

Figure 2:
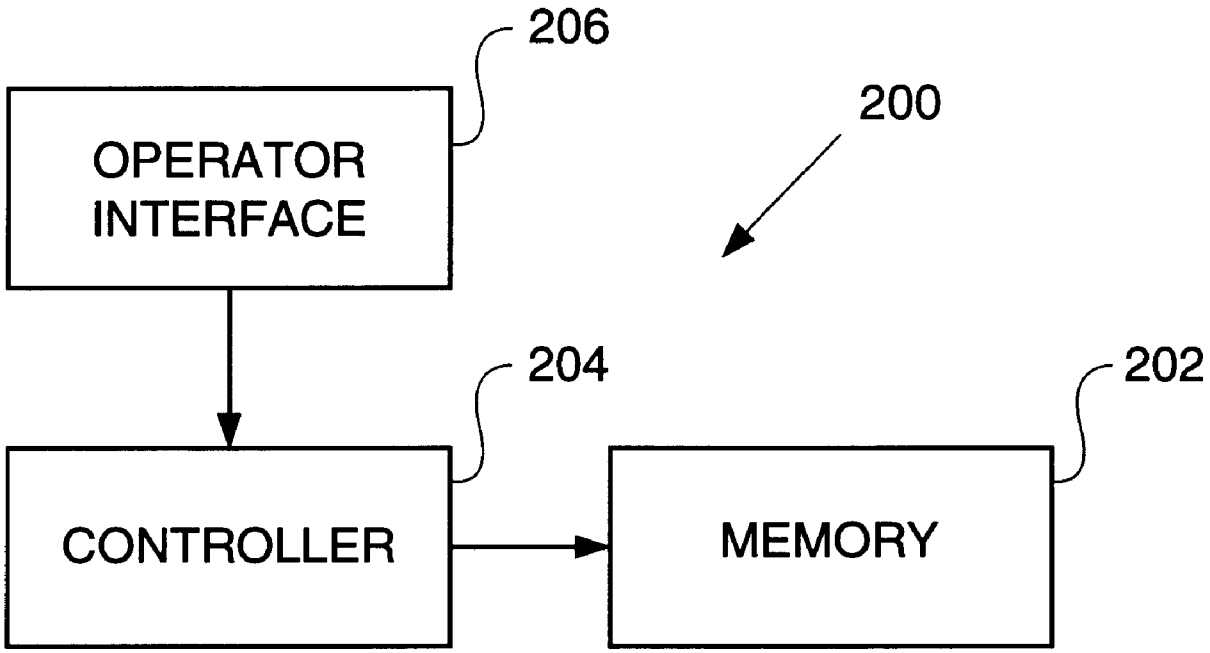
FIG. 2 is a schematic view of a calibration system used in connection with the preferred embodiment of the present invention.

In FIG. 2, the work machine 100 includes a control system 200 having a calibration system sufficient to provide at least one calibration prompt message to the operator. Preferably, control system 200 includes a memory 202 associated with a controller 204 and an operator interface 206. Preferably, the memory 202 is adapted to store at least one calibration prompt message containing a detailed description of the calibration step to be performed and at least one abbreviated calibration routine message containing a description of the calibration routine or mode. Advantageously, abbreviated calibration routine messages and calibration prompt messages such as those shown in the left and right columns of Tables A and B, respectively, below are stored in memory 202.

TABLE A

| | |
|---|---|
| CAL NORM | Position articulation and moldboard rotation at zero. Press Enter. |
| CAL NORM | Ground moldboard using float. Press Enter. |
| CAL NORM | Mark moldboard, front axle, and tandem pivot locations. Press Enter. |
| CAL NORM | Hold |
| CAL NORM | Lift moldboard. Turn machine around, ground moldboard on previous moldboard marks using float. Press Enter. |
| CAL NORM | Hold |
| CAL NORM | Lift moldboard. Move machine ahead. Place front axle over previous tandem pivot position. Ground moldboard using float. Press Enter. |
| CAL NORM | Hold |
| CAL NORM | Lift moldboard. Move machine ahead. Place tandem pivot over previous tandem pivot marks. Ground moldboard using float. Press Enter. |
| CAL NORM | Hold |
| CAL NORM | Accepted |

TABLE B

| | |
|---|---|
| CALQUICK | Blade ZERO |
| CALQUICK | Position articulation and moldboard rotation at zero. Press Enter. |
| CALQUICK | Ground moldboard on level surface using float. Press Enter. |

TABLE B-continued

| | |
|---|---|
| CALQUICK | Hold |
| CALQUICK | Accepted |
| CALQUICK | Frame ZERO |
| CALQUICK | Position articulation and moldboard rotation at zero. Press Enter. |
| CALQUICK | Park machine on a known level surface. Press Enter. |
| CALQUICK | Ground moldboard on level surface using float. Press Enter. |
| CALQUICK | Hold |
| CALQUICK | Accepted |

The foregoing abbreviated calibration routine messages and calibration prompt messages are representative of calibration routine messages and calibration prompt messages. However, other messages well known in the art could be readily and easily used with the present invention without departing from the scope of the present invention as defined by the appended claims.

Figure 3:
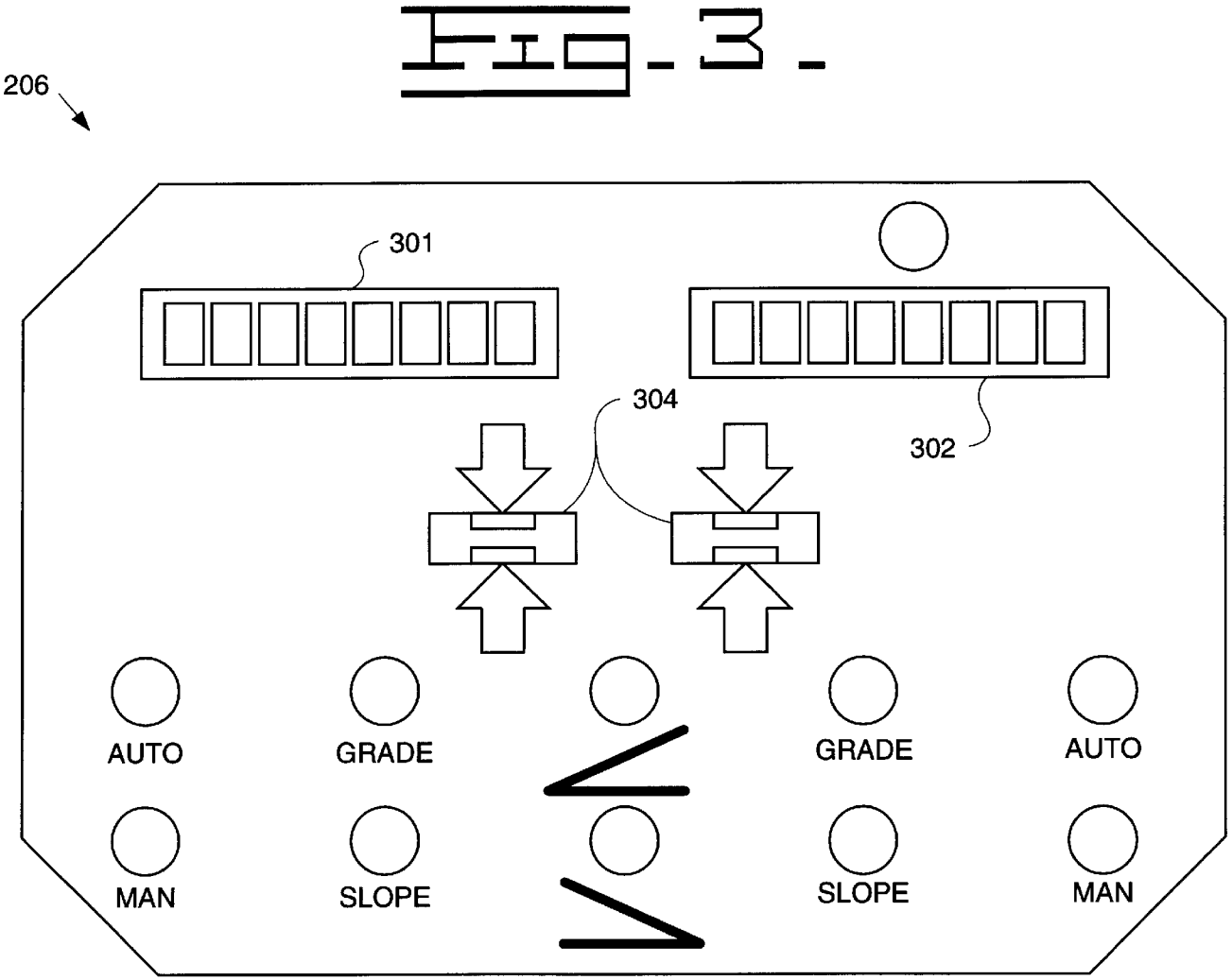
FIG. 3 is a top view of an operator interface used in connection with the preferred embodiment of the present invention.

An operator interface 206 is adapted to provide at least one calibration prompt message to the operator, preferably in the operator compartment. The operator interface 206 may be a liquid crystal display, console, keyboard, push buttons, voice recognition devices, a laptop computer, speakers, or other interfaces well known in the art or, preferably, two eight-character displays 301, 302 (FIG. 3) in combination with switches 304 (FIG. 3). Preferably, the operator interface 206 is adapted to provide the abbreviated calibration routine message to the operator in a text message on a first display 301 (FIG. 3) and provide the calibration prompt message to the operator in a scrolling text message across a second display 302 (FIG. 3) of the user interface 206. Alternatively, the operator interface 206 may be adapted to provide the abbreviated calibration routine message and/or the calibration prompt message to the operator as an audible message.

A preferred embodiment of the operator interface 206 is shown in FIG. 3 as having a first eight-character display 301 and a second eight-character display 302. Preferably, operator input switches 304 are included in the operator interface 206.

Referring back to FIG. 2, controller 204 is associated with the memory 202 and receives the at least one calibration prompt message from the memory 202. Further, controller 204 is adapted to determine whether the work machine control system 200 is in calibration mode and responsively provide the calibration prompt message to the operator interface 206.

Figure 4A:
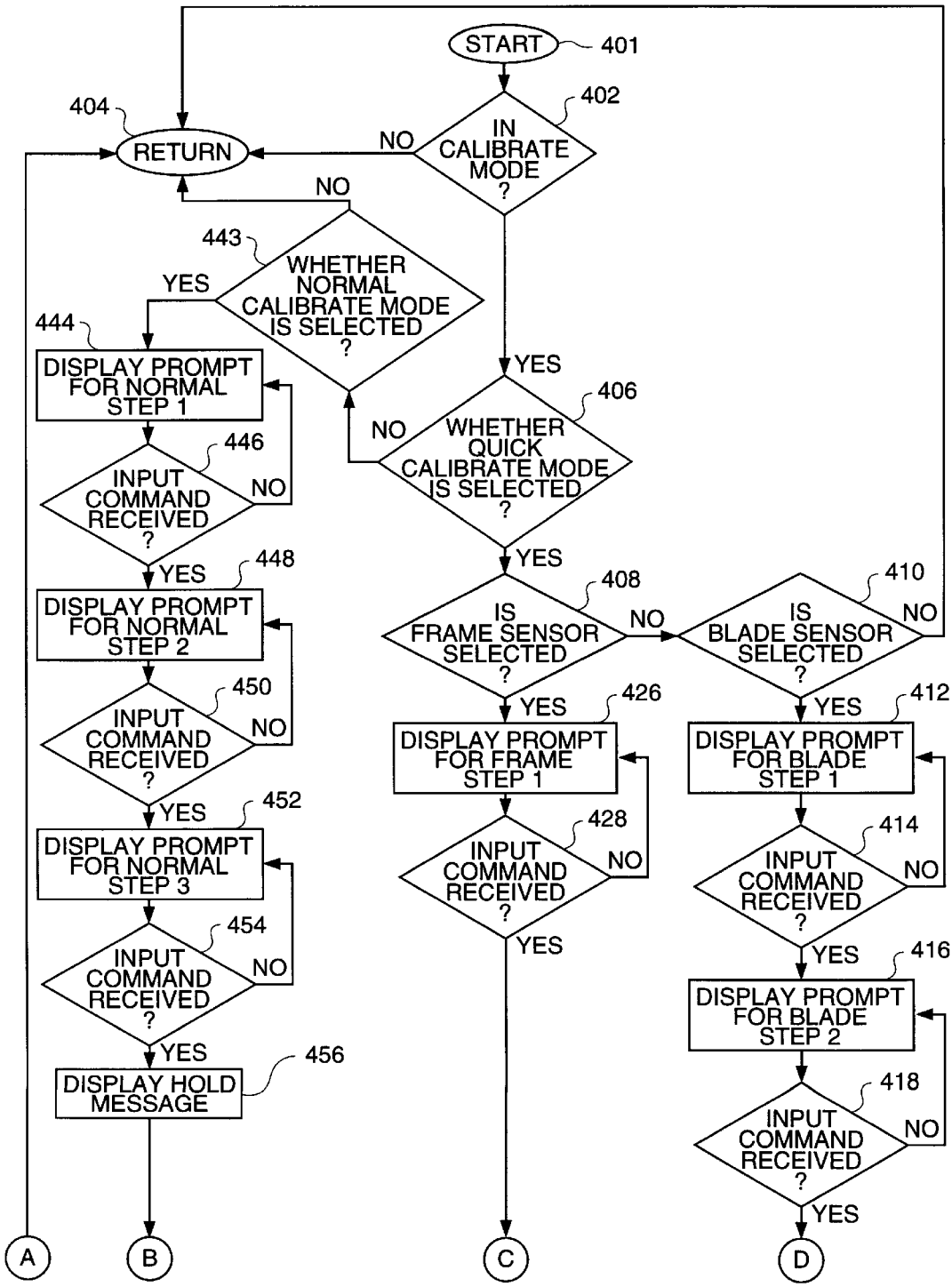
FIGS. 4*a* and 4*b* are a flow chart of software logic implemented in a preferred embodiment of the present invention.
Figure 4B:
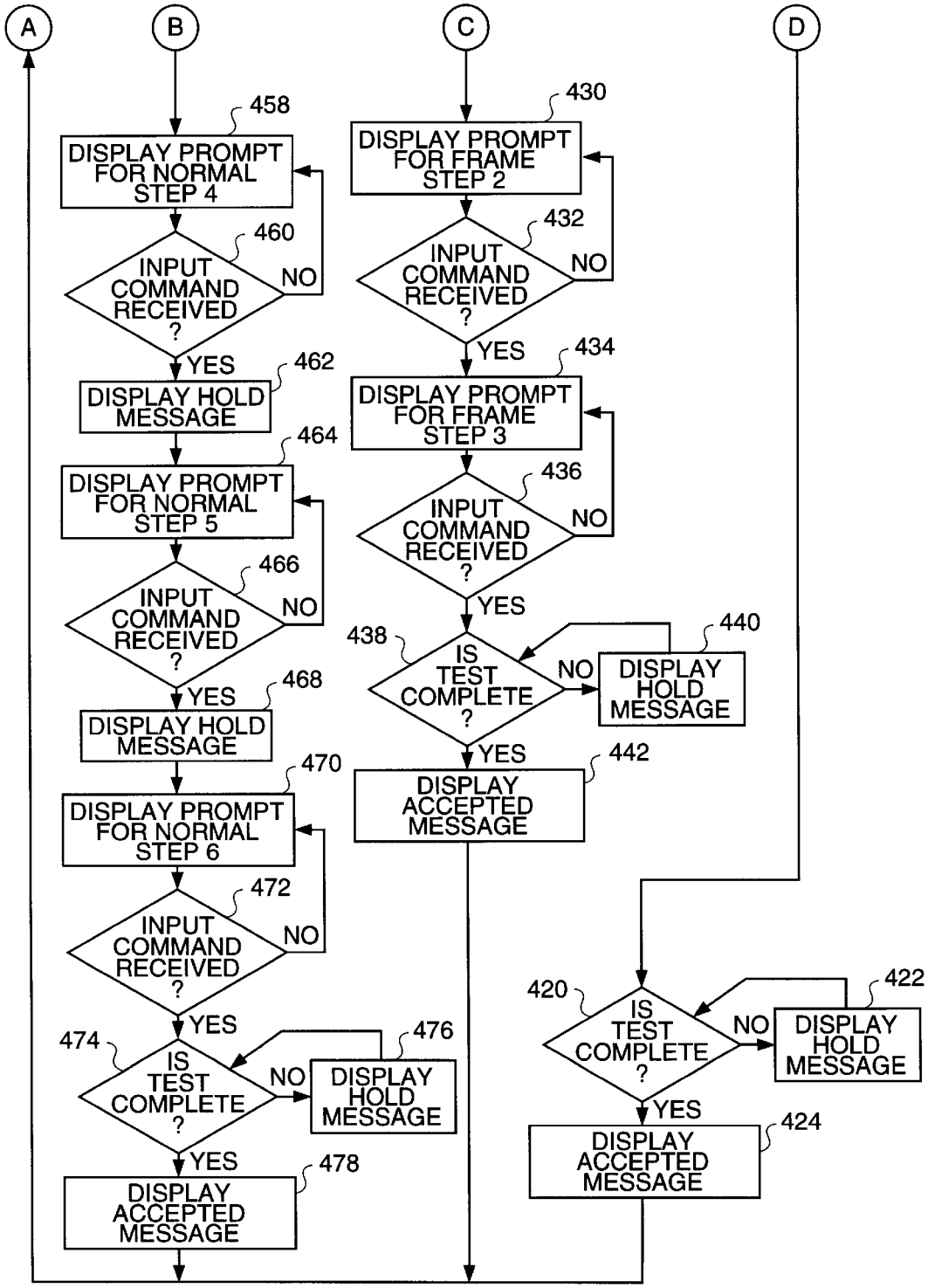

Referring now to FIG. 4, a flowchart of the software logic used in connection with the preferred embodiment is shown. Those skilled in the art could readily and easily write software implementing the flowchart shown in FIG. 4 using the instruction set, or other appropriate language associated with the particular microprocessor to be used. In a preferred embodiment, a Motorola 68HC11 is used in the electronic controller 204. However, other known microprocessors could be readily and easily used without deviating from the scope of the present invention as defined in the appended claims.

First block 401 begins the program control. Program control passes from first block 401 to first decision block 402. In first decision block 402, the controller 204 determines whether the work machine control system is in calibration mode. If the control system is not in calibration mode, program control passes to twenty-second block 404. Otherwise, program control passes to second decision block 406.

In second decision block 406, the controller 204 determines whether quick calibration mode is selected. If quick calibration mode is not selected, program control passes to nineteenth decision block 443. Otherwise, program control passes to third decision block 408.

In third decision block 408, the controller 204 determines whether the frame sensor is selected for calibration. If the frame sensor is selected for calibration, program control passes to sixth block 426. Otherwise, program control passes to fourth decision block 410.

In fourth decision block 410, the controller 204 determines whether the blade sensor is selected. If the blade sensor is not selected, program control passes to twenty-second block 404. Otherwise, program control passes to second block 412.

In second block 412, the abbreviated calibration routine message and the calibration prompt message for the first step of the blade calibration process are displayed on the eight-character displays 301, 302, respectively. Preferably, the calibration routine message and the calibration prompt message are "CALQUICK" and "Position articulation and moldboard rotation at zero. Press Enter," respectively. From second block 412, program control passes to fifth decision block 414.

In fifth decision block 414, the controller 204 determines whether the input command from the operator has been received. Typically, when input commands are received from the operator, various calibration values may be stored in memory 202. If the input command from the operator has not been received, program control passes back to second block 412. Otherwise, program control passes to third block 416.

In third block 416, the calibration routine message and the calibration prompt message containing a message describing the second step in the process for calibrating the blade sensor is displayed. Preferably, the calibration routine message and the calibration prompt message are "CALQUICK" and "Ground moldboard on level surface using float. Press Enter," respectively. From third block 416, program control passes to sixth decision block 418.

In sixth decision block 418, the controller 204 determines whether the operator input command has been received. If the operator input command has not been received, then program control passes back to third block 416. Otherwise, program control passes to seventh decision block 420.

In seventh block 420, the controller determines whether the calibration testing is completed based upon the calibration values stored when operator input commands are received during previous calibration steps. If the test is determined to be completed, program control passes to fifth block 424. Otherwise, program control passes to fourth block 422.

In fourth block 422, the operator interface 206 displays a hold message. Preferably, the hold message displays the word "Hold" in the second eight-character display 302. From fourth block 422, program control passes back to seventh decision block 420.

Referring back to fifth block 424, the operator interface 206 displays the "Accepted" message. Preferably, the "Accepted" message includes displaying the word "Accepted" in the second eight-character display 302. From fifth block 424, program control passes to twenty-second block 404.

Referring back to sixth block 426, the operator interface 206 displays the calibration routine message and the calibration prompt message for the first step in the calibration process for calibrating the frame. Preferably, the calibration routine message and calibration prompt message is "CALQUICK" and "Position articulation and moldboard rotation at zero. Press Enter," respectively. From sixth block 426, program control passes to eighth control block 428.

In eighth control block 428, the controller 204 determines whether the operator input command has been received. If the operator input command has not been received, program control passes back to sixth block 426. Otherwise, program control passes to seventh block 430.

In seventh block 430, the operator interface 206 displays the calibration routine message and the calibration prompt message for the second step in the process of calibrating a frame. Preferably, the calibration routine message and calibration prompt message is "CALQUICK" and "Park machine on a known level surface. Press Enter," respectively. From seventh block 430, program control passes to ninth decision block 432.

In ninth decision block 432, the controller 204 determines whether the operator input command has been received. If the operator input command has been received, program control passes back to seventh block 430. Otherwise, program control passes to eight block 434.

In eighth block 434, the operator interface displays the calibration routine message and the calibration prompt message for the third step in the process of calibrating the frame. Preferably, the calibration routine message and calibration prompt message is "CALQUICK" and "Ground moldboard on level surface using float. Press Enter," respectively. From eighth block 434, program control passes to tenth decision block 436.

In tenth decision block 436, the controller 204 determines whether the operator input command has been received. If the operator input command has not been received, program control passes back to eighth block 434. Otherwise, program control passes to eleventh decision block 438.

In eleventh decision block 438, the controller 204 determines whether the testing is complete. If the calibration testing is complete, program control passes to tenth block 442. Otherwise, program control passes to ninth block 440.

In ninth block 440, the operator interface 206 displays the "Hold" message. Preferably, the "Hold" message includes displaying the word "Hold" on the second eight-character display 202. From ninth block 440, program control passes to eleventh decision block 438.

Referring back to tenth block 442, the operator interface 206 displays the "Accepted" message. Preferably, the "Accepted" message includes displaying the word "Accepted" on the second eight-character display 302. From tenth block 442, program control passes to twenty-second block 404.

Those skilled in the art could readily and easily provide different numbers of steps in the processes of calibrating the frame or the blade when in the quick calibration mode. However, such variations are contemplated by the present invention and should be considered within the scope of the present invention as defined by the appended claims.

Referring back to nineteenth decision block 443, the controller determines whether normal calibration mode is selected. If normal calibration mode is not selected, program control passes to twenty-second block 404. Otherwise, program control passes to tenth block 444.

In tenth block 444, program control reads the abbreviated calibration routine message and the calibration prompt message containing a detailed description of the first step in the normal process of calibration, preferably "CAL NORM" and "Position articulation and moldboard rotation at zero. Press Enter," respectively. These messages are provided to the operator interface 206 and are preferably displayed on the eight-character displays 301 and 302, respectively. Alternatively, these messages are provided to the operator via an audible message. From eleventh block 444, program control passes to twelfth decision block 446.

In twelfth decision block 446, the controller 204 determines whether the input command from the operator has been received. If the input command from the operator has not been received, program control passes back to eleventh block 444. Otherwise, program control passes to twelfth block 448.

In twelfth block 448, program control reads the abbreviated calibration routine message and calibration prompt message containing a detailed description of the second step of the normal calibration process, preferably "CAL NORM" and "Ground moldboard using float. Press Enter," respectively. These messages are provided to operator interface 206 and provided to the operator in the operator compartment. Preferably, these messages are provided to the operator via the two eight-character displays 301, 302, respectively. Alternatively, these messages are provided to the operator via an audible message. From twelfth block 448, program control passes to thirteenth control block 450.

In thirteenth control block 450, the controller 204 determines whether the input command has been received. If the input command has not been received, program control passes back to twelfth block 448. Otherwise, program control passes to the thirteenth block 452.

In thirteenth block 452, program control reads the abbreviated calibration routine message and calibration prompt message for the third step in the normal calibration process, preferably "CAL NORM" and "Mark moldboard, front axle, and tandem pivot locations. Press Enter," respectively. These messages are provided to operator interface 206 and to the operator in the operator compartment. Preferably, these messages are provided on the two eight-character displays 301, 302. Alternatively, these messages are provided as an audible message. From thirteenth block 452, program control passes to fourteenth control block 454.

In fourteenth control block 454, the controller 206 determines whether the input commands have been received. If the input commands have not been received, program control passes back to thirteenth block 452. Otherwise, program control passes to fourteenth block 456.

In fourteenth block 456, program control averages any data stored as part of the calibration process and provides a "Hold" message to the operator interface 206. Preferably, the "Hold" message is displayed on second eight-character display 302. Once any averaging of calibration values is complete, program control passes to fifteenth block 458.

In fifteenth block 458, program control reads the abbreviated calibration routine message and calibration prompt message containing a detailed description of the fourth step in the normal calibration process, preferably "CAL NORM" and "Lift moldboard. Turn machine around, ground moldboard on previous moldboard marks using float. Press Enter," respectively. These messages are provided to the operator interface 206 and provided to the operator in the operator compartment. Preferably, these messages are provided on the two eight-character displays 301, 302. Alternatively, these messages are provided as an audible message. From fifteenth block 458, program control passes to fifteenth decision block 460.

In fifteenth decision block 460, the controller 204 determines whether the input command has been received. If the input command has not been received, program control passes back to fifteenth block 458. Otherwise, program control passes to sixteenth block 462.

In sixteenth block 462, program control reads a "Hold" message and provides this message to operator interface 206 while some values stored during the calibration process may be averaged. Preferably, the "Hold" message is displayed on second eight-character display 302. From sixteenth block 462, program control passes to seventeenth block 464.

In seventeenth block 464, program control reads the abbreviated calibration routine message and the calibration prompt message containing a detailed description of the fifth step in the normal calibration process, preferably "CAL NORM" and "Lift moldboard. Move machine ahead. Place front axle over previous tandem pivot position. Ground moldboard using float. Press Enter," respectively. These messages are provided to the operator interface 206 and to the operator in the operator compartment. Preferably, these messages are provided on the two eight-character displays 301, 302. Alternatively, these messages are provided via an audible message. From seventeenth block 464, program control passes to sixteenth decision block 466.

In sixteenth decision block 466, a controller 204 determines whether the input command has been received. If the input command has not been received, program control passes back to seventeenth block 464. Otherwise, program control passes to eighteenth block 468.

In eighteenth block 468, program control reads the "Hold" message and provides the "Hold" message to the operator interface 206 while some values stored during the calibration process may be averaged. Preferably, the "Hold" message is displayed on the second eight-character display 302. Alternatively, the message is provided via an audible message. From eighteenth block 468, program control passes to nineteenth block 470.

In nineteenth block 470, program control reads the abbreviated calibration routine message and the calibration prompt message for containing a detailed description of the sixth step of the normal calibration process, preferably, "CAL NORM" and "Lift moldboard. Move machine ahead. Place tandem pivot over previous tandem pivot marks. Ground moldboard using float. Press Enter," respectively. These messages are provided to the operator interface 206 in the operator compartment. Preferably, these messages are provided on the two eight-character displays 301, 302. Alternatively, these messages are provided via an audible message. From nineteenth block 470, program control passes to seventeenth decision block 472.

In seventeenth decision block 472, the controller 204 determines whether the input command has been received. If the input command has not been received, program control passes back to nineteenth block 470. Otherwise, program control passes to eighteenth decision block 474.

In eighteenth decision block 474, the controller 204 determines whether the test is complete. If the test is complete, program control passes to twenty-first block 478. Otherwise, program control passes to twentieth block 476.

In twentieth block 476, program control reads the "Hold" message and provides the message to the operator interface 206. Preferably, the "Hold" message is provided on second eight-character display 302. From twentieth block 476, program control passes back to eighteenth decision block 474.

Referring back to twenty-first block 478, program control reads the "Accepted" message and provides this message to operator interface 206. Preferably, the "Accepted" message is displayed on second eight-character display 302 for a sufficient time to allow the operator to recognize the message, advantageously this is until the operator changes the calibration mode or exits calibration mode. From twenty-first block 478, program control passes to twenty-second block 404.

In twenty-second block 404, program control returns to the main program. The logic of FIG. 4 is performed every control loop. In order to provide the calibration information to the operator in a timely manner. However, those skilled in the art know that aspects of the work machine control system calibration system could be determined at other frequencies depending on various factors without deviating from the invention as defined by the appended claims.

While aspects of the present invention have been particularly shown and described with reference to the preferred embodiment above, it will be understood by those skilled in the art that various additional embodiments may be contemplated without departing from the spirit and scope of the present invention. For example, instead of or in conjunction with providing a scrolling text message to the operator, an audible message could be provided to the operator. Similarly, messages could be provided to the operator in different or multiple languages or additional characters or lines of a display could be used to provide the messages on the operator interface 206. However, a device or method incorporating such an additional embodiment shall be understood to fall within the scope of the present invention as determined based upon the claims below and any equivalents thereof.

INDUSTRIAL APPLICABILITY

Motor graders 102 having a blade 106 are often used to cut a grade and/or a slope across the earth. To accomplish this, often electronic control is used to assist the operator in controlling the blade 106 to provide the desired slope and/or grade. The electronic controls typically are associated with several sensors, solenoids, circuits, and related mechanisms. From time to time, these need calibration. It is advantageous for the operator to receive an abbreviated calibration routine message and a calibration prompt message containing a detailed description of the calibration step to be performed in a manner that is easily and readily understood by almost anyone familiar with work machines, including new operators or operators possessing a relatively low level of skill or familiarity with the work machine.

The apparatus and method of certain embodiments of the present invention, when compared with other methods and apparatus, may have the advantageous of providing at least one abbreviated calibration routine message and at least one calibration prompt message containing a detailed description of the calibration step to be performed to the operator; eliminating the need for an operator to refer to a cross reference chart or other documentation to understand the calibration process; reducing the required skill and knowledge of an operator of the work machine; and being more economical to use. Such advantageous are particularly worth of incorporating into the design, manufacture, and operation of work machines. In addition, the present invention may provide other advantages that have not been discovered yet.

It should be understood that while the preferred embodiment is described in connection with motor graders 102 having a blade 106, the present invention is readily adaptable to provide configuration parameters to the operators on other work machines.

Other aspects, objects, and advantages of the present invention can be obtained from a study of the drawings, the disclosure, and the appended claims.

We claim:

1. A work machine adapted to be controlled by an operator, comprising:

a frame;

a plurality of ground engaging devices supporting the frame;

an operator compartment supported by the ground engaging devices;

an engine operably coupled to the ground engaging devices; and a work machine control system having a calibration system, including:

a memory adapted to store at least one calibration prompt message containing a detailed description of the calibration step to be performed;

a controller associated with the memory and adapted to receive the at least one calibration prompt message, determine whether the work machine control system is in calibration mode, and responsively provide the at least one calibration prompt message; and an operator interface adapted to receive the at least one calibration prompt message and provide the at least one calibration prompt message to the operator in the operator compartment.

2. The work machine of claim 1, wherein the operator interface is adapted to provide the calibration prompt message to the operator in the operator compartment as a scrolling text message.

3. The work machine of claim 1, wherein the operator interface is adapted to provide the calibration prompt message to the operator in the operator compartment as an audible message.

4. The work machine of claim 1, wherein the operator interface is adapted to receive an input from the operator and provide the input to the controller and the controller is adapted to receive the input and responsively provide a subsequent calibration prompt message to the operator interface, the operator interface being adapted to provide the subsequent calibration prompt message to the operator in the operator compartment.

5. A method of providing calibration information to an operator of a work machine, comprising the steps of:

determining whether the work machine control system is in calibration mode;

reading at least one calibration prompt message containing a detailed description of the calibration step to be performed from a memory; and providing the at least one calibration prompt message to the operator.

6. The method of claim 5, wherein the step of providing the at least one calibration prompt message to the operator includes providing a text message to the operator from a user interface.

7. The method of claim 6, including the step of scrolling the text message of the calibration prompt message across the user interface.

8. The method of claim 5, wherein the step of providing the at least one calibration prompt message to the operator includes providing an audible message to the operator from a user interface.

9. The method of claim 5, including the step of providing at least one additional calibration prompt message to the operator in response to an operator input.

10. A method of providing calibration information to an operator of a work machine, comprising the steps of:

determining whether the work machine control system is in calibration mode;

determining whether quick calibration mode is selected;

determining whether the frame sensor or the blade sensor is selected for calibration;

reading at least one abbreviated calibration routine message and at least one calibration prompt message containing a detailed description of the calibration step to be performed from a memory in response to the steps of determining whether the work machine control system is in calibration mode, determining whether quick calibration mode is selected, and determining whether the frame sensor or the blade sensor is selected for calibration; and providing the at least one abbreviated calibration routine message to the operator in a text message on a first display and the calibration prompt message to the operator in a scrolling text message across a second display of the user interface while the work machine control system is in calibration mode.

* * * * *